Feb. 14, 1950 W. E. SNOW 2,497,474
TRUCK TAIL GATE LIFT

Filed May 28, 1948 3 Sheets-Sheet 1

INVENTOR.
Walter E. Snow
BY
McMorrow, Berman & Davidson
ATTORNEYS

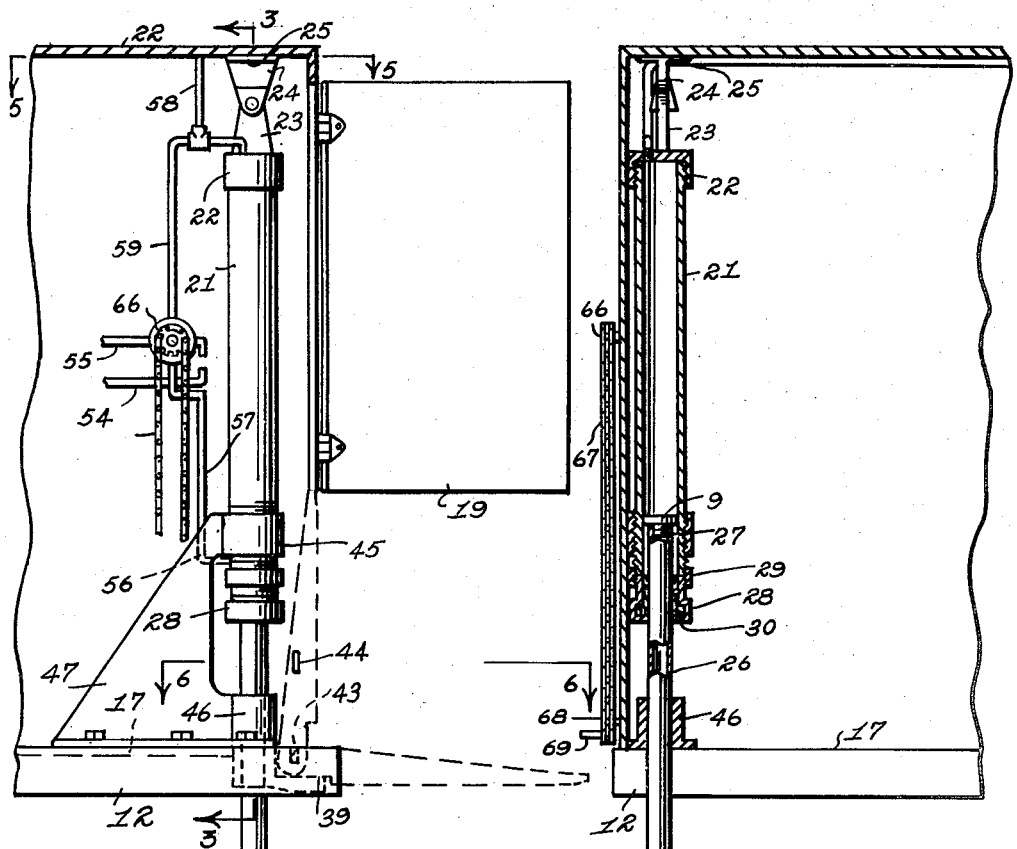

Feb. 14, 1950 W. E. SNOW 2,497,474
TRUCK TAIL GATE LIFT
Filed May 28, 1948 3 Sheets-Sheet 3
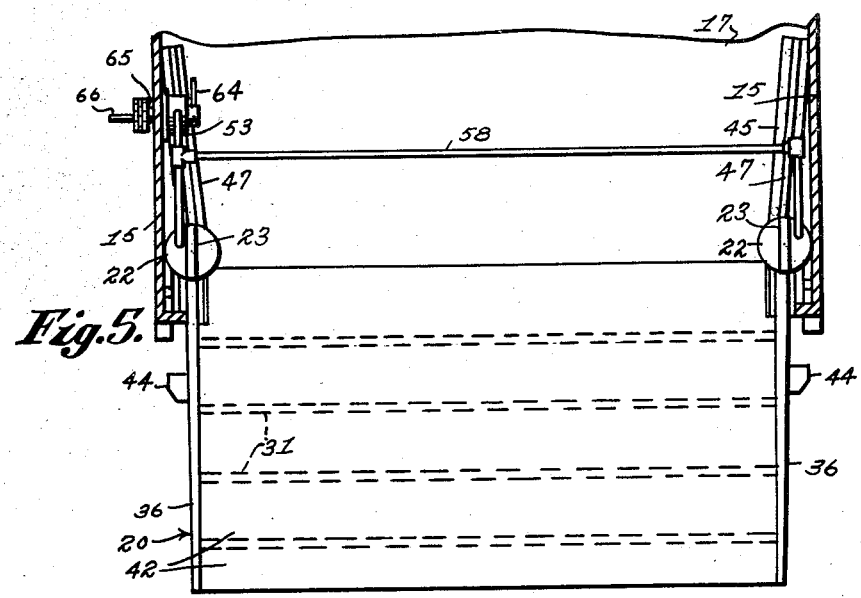
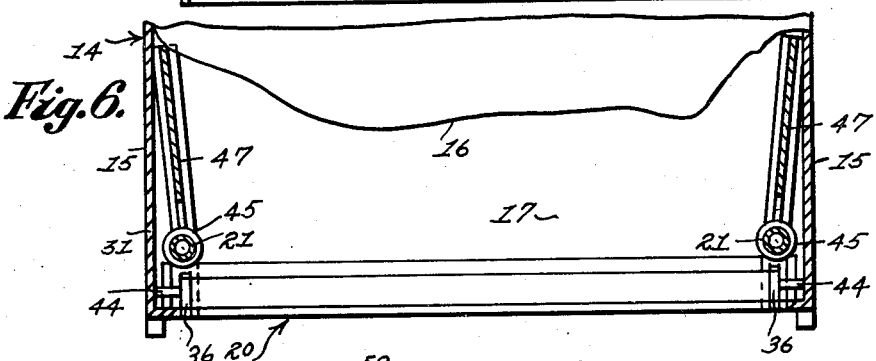
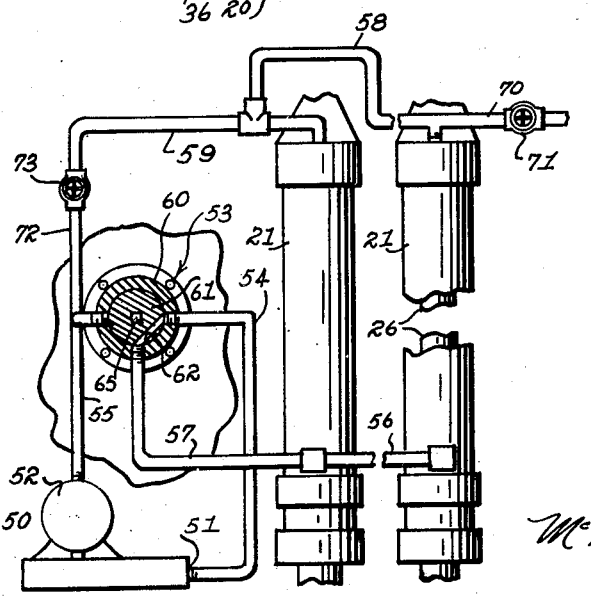
INVENTOR.
Walter E. Snow
BY
McMorrow, Berman & Davidson
ATTORNEYS Patented Feb. 14, 1950

2,497,474

UNITED STATES PATENT OFFICE 2,497,474

TRUCK TAIL GATE LIFT

Walter E. Snow, Rockland, Maine

Application May 28, 1948, Serial No. 29,891

3 Claims. (Cl. 214—75)

This invention relates to improvements in loading devices for burden vehicles, and more particularly to an improved tail gate lift for trucks and trailers.

At regular loading stations suitable platforms are usually provided, substantially level with the floor of a truck or trailer body, over which articles transported by such trucks or trailers are moved into and out of the bodies. It is frequently necessary, however, to load or unload a heavy article at a location at which no suitable platform is provided. Such a loading or unloading operation involves dangerously heavy lifting on the part of persons performing such operation and may result in expensive damage to the article being loaded or unloaded. It has been proposed to provide trucks or trailers with suitable lift means to load and unload heavy articles where a loading platform is not available, but such previously proposed devices have been subject to various defects and have not met with any substantial degree of commercial success.

It is among the objects of the present invention to provide an improved loading and unloading lift for a truck or trailer which lift utilizes the truck or trailer tail gate as a lift platform and includes hydraulically-operated mechanism for raising the tail gate from the ground level to the body floor of the vehicle and for lowering the tail gate from the floor level to the ground, in which the tail gate is firmly supported in substantially horizontal position while being used as a lift platform and is positively locked in substantially vertical position during its normal use as a tail gate, in which the lift mechanism is manually controllable from both inside and outside the vehicle body, and in which the entire lift mechanism is simple, durable and economical in construction, easy to install in a conventional body of a burden vehicle, and is simple and easy to operate.

Other objects and advantages will become apparent from a consideration of the following description and appended claims in conjunction with the accompanying drawings, wherein:

Figure 2 is a longitudinal cross-section of a fragmentary rear portion of a vehicle body and frame showing the improved loading and unloading lift in vertical elevation;

Figure 3 is a transverse cross-section taken substantially in the plane of the section line 3—3 of Figure 2;

Figure 4 is a diagrammatic elevation of a fragmentary portion of the improved lift showing the tial gate releasably locked in substantially vertical position;

Figure 5 is a generally horizontal cross-section taken substantially in the plane of the section line 5—5 of Figure 2;

Figure 6 is a generally horizontal cross-section taken substantially in the plane of the section line 6—6 of Figure 2;

Figure 7 is a diagrammatic elevation showing the hydraulic-operating mechanism for the lift, the control valve for this mechanism being shown in transverse cross-section.

Figure 1:
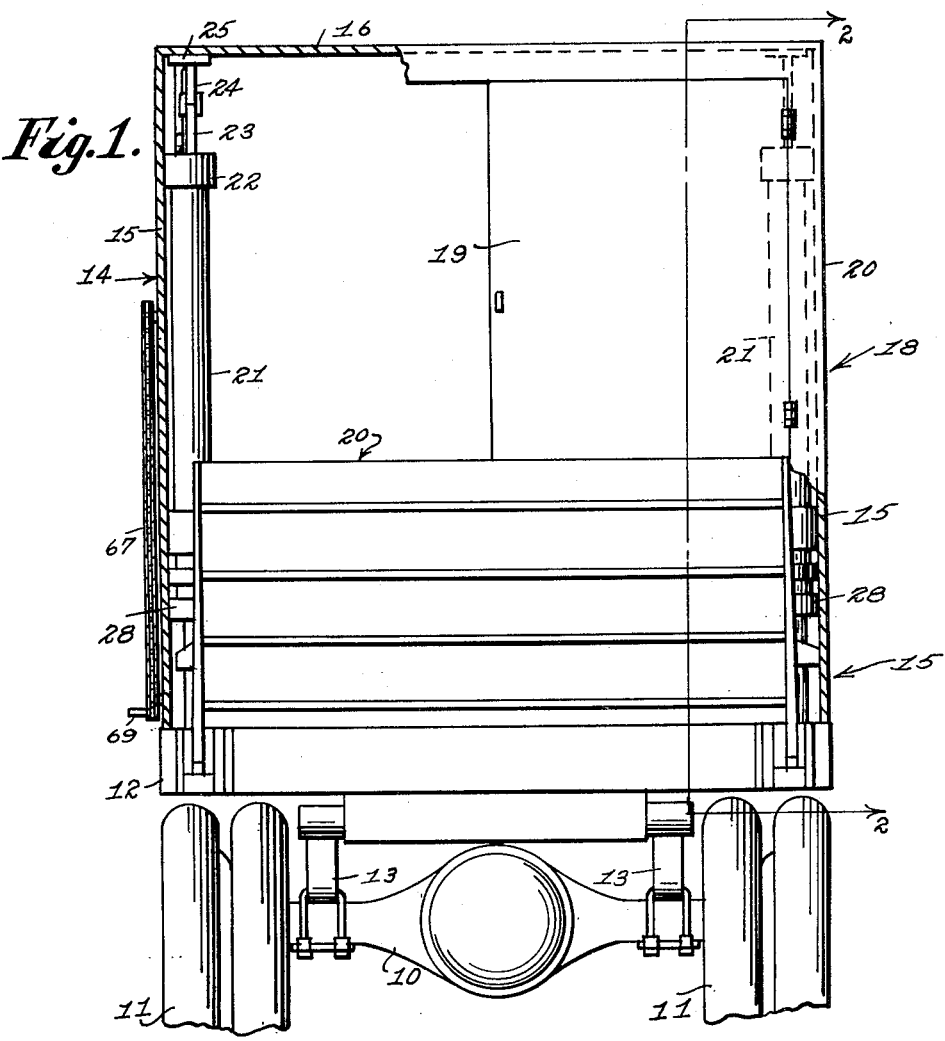
Figure 1 is a rear elevation of a conventional truck or trailer with a loading and unloading lift illustrative of the invention applied thereto, portions of the truck or trailer body being broken away and shown in cross-section to better illustrate the application of the improved lift thereto.

With continued reference to the drawings, the conventional truck or trailer illustrated has a rear axle 10 supported by rear road wheels 11, a frame 12 supported upon the axle by conventional springs 13 and a body, generally indicated at 14, having side walls 15, a top or roof 16, a floor 17, and a rear opening or doorway closable by the doors 19 and the tail gate, generally indicated at 20.

The improved hydraulic lift mechanism includes a pair of elongated, hydraulic cylinders 21 supported in substantially vertical position one at each side of the rear doorway or opening of the body 14 in substantially vertical position. As illustrated, each of these cylinders is screw-threaded near its lower end into the upper one 45 of a pair of vertically-spaced sleeves 45 and 46 on the rearward edge of a triangular bracket 47 secured at its bottom edge to the floor of the vehicle body. Brackets 47 support the vertical loads applied to cylinders 21 but where the lift is mounted in a closed body having a top, each cylinder may be provided with an upwardly-extending lug 23 projecting upwardly from the respective top cap 22 and pivotally connected at its upper end to a depending lug 24 secured to a suitable supporting structure 25 at the under-side of the body top 16 to secure the cylinders against lateral movement at their upper ends.

A respective piston 9 is reciprocable in each tubular cylinder 21 and a tubular piston rod 26 extends through the bottom end of each cylinder and is connected at its upper end to the corresponding piston 9. As illustrated in Figure 3, the piston has an axial screw-threaded stem 27 threaded into the upper end of the piston rod to operatively secure the rod to the piston. A packing gland 28 is secured to the bottom end of each cylinder by suitable means, such as respective union rings 29, and includes packing 30 which surrounds the piston rod and prevents leakage of hydraulic fluid from the bottom end of each cylinder.

Each piston rod 26 extends downwardly through the lower sleeve 46 on the corresponding bracket 47 and through a suitable aperture in the body floor 17, being guided in its reciprocable, vertical movements by the respective bracket sleeve 46.

Figure 8:
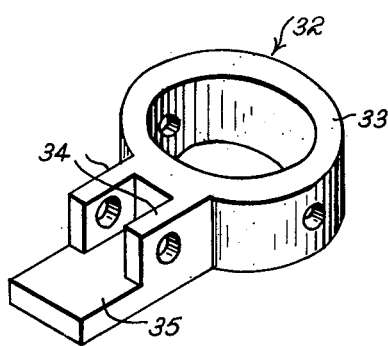
Figure 8 is a perspective view of a bracket for securing the tail gate to a piston rod of the hydraulic mechanism.

A respective bracket, generally indicated at 32 and particularly illustrated in Figure 8, is secured onto the bottom end of each piston rod 26. The bracket 32 comprises a cylindrical sleeve 33 which receives the bottom end of the respective piston rod 26 and is secured thereto by suitable means, such as the through bolt or pin 34, and an extension at one side of the sleeve providing a pair of spaced-apart, apertured ears 35 substantially vertically arranged above an outwardly-extending horizontal abutment 35'.

The tail gate 29 has at each end thereof a batten 36 having a rounded apertured end 37 received between the ears 35 of the corresponding bracket 32 and pivotally secured thereto by a pin 38. Each batten has adjacent the rounded end thereof a straight edge 39 terminating in a shoulder 40 from which the bottom edge of the batten extends to the outer end thereof. When the tail gate is in the horizontal position, illustrated in Figures 2 and 3, the straight edge 39 of each batten rests upon the abutment 35' of the corresponding bracket 32 to provide a firm support for the tail gate while it is being used as a lift platform. The upper edge 41 of each batten is preferably inclined relative to the bottom edge so that the battens are outwardly tapered and the two battens 36 are connected by transversely extending, substantially parallel bars 31. A transverse plate 42 is secured to the batten and transverse bar structure at one side thereof to constitute the complete tail gate. The battens and transverse bars have their major transverse dimensions perpendicular to plate 42 to provide a strong and rigid tail gate structure for use as a lift platform.

As particularly illustrated in Figure 2, the frame 12 extends rearwardly of the piston rods 26 and is provided at the rear of each piston rod with a respective notch 43 in its upper surface. Each tail gate batten 36 is provided with an outwardly-extending lug 44 and when the tail gate is in its normal, substantially vertical position, particularly illustrated in Figure 4, the lugs 44 are received in corresponding notches 43 and the tail gate is thereby releasably locked in its normal position extending across the lower part of the rear opening or doorway of the vehicle body.

When the device is used as a loading or unloading lift, the tail gate is brought to the horizontal position illustrated in Figures 2 and 3 and, if an object is to be lifted, is lowered to the ground level. The object is then placed on the upper surface of the tail gate and hydraulic fluid under pressure is admitted to the bottom ends of cylinders 21 forcing the pistons 9 upwardly and raising the horizontally-disposed tail gate to the level of the floor 17 of the vehicle body. When the lift is used for unloading, the tail gate is first elevated, in horizontal position, to the level of the body floor, the object placed thereon and hydraulic fluid permitted to escape from the spaces between the pistons 9 and the bottom ends of the corresponding cylinders 21 so that the tail gate platform is controllably lowered from the floor level of the vehicle body to the ground level.

The hydraulic mechanism for operating the improved lift comprises a conventional hydraulic pump 50 having an inlet 51 and an outlet to which is connected a pressure fluid supply tank 52. The pump inlet is hydraulically connected to one side of a four-way control valve, generally indicated at 53, by a conduit 54 and the supply tank 52 is connected to the opposite side of the control valve by a conduit 55. The two bottom ends of the cylinder 21 are connected together by a conduit 56 which is connected by a conduit 57 with the valve 53 between the conduits 54 and 55. The upper ends of the cylinders are connected together by a conduit 58 which is connected at one end to a vent pipe 70 having a manually operated valve 71 therein and the opposite end of conduit 58 is connected by a conduit 72 to conduit 55 leading from supply tank 52. A manually operated valve 73 normally closes conduit 72 but if it is desired to raise the rear end of the truck by the lift apparatus valve 71 may be closed and valve 73 opened to supply pressure fluid to the upper ends of cylinders 21.

The valve 53 comprises an annular or cylindrical housing 60 having three ports therein spaced substantially 90 and 180 degrees apart and receiving the corresponding ends of the conduits 54, 55, and 57, and a rotatable valve disc or cylinder 61 having a chord-wise passage 62 therein arranged to connect together valve ports disposed 90 degrees apart. The valve has two operative positions, one of which is illustrated in Figure 7. In this position conduit 57, connected to the bottom ends of the cylinders, is connected through valve passage 62 with the fluid-return conduit 54 leading to the pump intake 51 to exhaust fluid from the spaces in the cylinders below the pistons to lower platform 20. If the valve is turned to an operative position at 90 degrees from the position illustrated in Figure 7 the pressure conduit 55 will be connected to the conduit 57 to supply hydraulic fluid under pressure to the spaces within the cylinders below the pistons so that the pistons will be caused to rise in the cylinders, thereby elevating the tail gate 36 to lift an object from the ground level to the floor level of the vehicle body.

As shown in Figures 2 and 5, valve 53 is mounted upon one of the side walls of the vehicle body and is provided with an operating handle 64 inside of the vehicle body so that the valve may be operated from a position within the body to move the lift up or down. The valve shaft 65 extends through the body side and is provided outside of the body with a small chain sprocket 66 from which a link chain 67 depends to a corresponding sprocket 68 journaled on an axle extending outwardly from the side of the body near the bottom thereof. Sprocket 68 is provided with a handle 69 so that the valve 53 can also be conveniently controlled by a person standing outside of the vehicle body.

When it is desired to secure the tail gate 20 in its substantially vertical position extending across the bottom end of the rear opening of the body, the tail gate is first elevated to its uppermost position, as shown in broken lines in Figure 2 in which it is substantially level with the floor of the vehicle body. It is then moved from its horizontal to a substantially vertical position, also indicated in broken lines in Figure 2, and is then lowered until the lugs 44 engage in the corresponding notches 43 whereupon the tail gate is securely locked in its generally vertical position and cannot be released until it is intentionally raised to move the lugs 44 out of the corresponding notches.

The invention may be embodied in other specific forms without departing from the spirit or essential characteristics thereof. The present embodiment, is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A loading and unloading lift for a burden vehicle having a frame and a body supported on said frame and provided with a rear door opening, said lift comprising a pair of hydraulic cylinders supported in the body, one at each side of the rear door opening therein, a piston slidable in each cylinder, a respective piston rod attached at its upper end to each piston and extending downwardly through the bottom end of each cylinder, a respective bracket secured on the bottom end of each piston rod, each bracket having a pair of apertured ears and a horizontal abutment extending outwardly from said ears, a tail gate pivotally connected at its opposite ends to said bracket ears and supported in horizontal position by said bracket abutments, said vehicle frame extending rearwardly of said body at each side of said rear door opening and having notches in the upper edges thereof, a pair of lugs disposed one on each end of said tail gate and engageable in said notches to releasably lock said tail gate in substantially vertical position, a control valve hydraulically connected to the bottom ends of both hydraulic cylinders, and a fluid pump having a fluid inlet and a fluid outlet hydraulically connected to said valve, said valve being operative to reversibly connect the lower ends of said cylinders with said pump outlet and inlet.

2. A loading and unloading lift for a burden vehicle having a frame and a body supported on said frame and having a rear door opening in said body, said lift comprising a pair of substantially vertically-disposed hydraulic cylinders mounted in the body one at each side of said rear door opening, a piston in each cylinder, a piston rod slidable through the bottom end of each cylinder and connected at its upper end to the corresponding piston, a bracket on the bottom end of each piston rod, a tail gate pivotally connected at its opposite ends to said brackets and supported by said brackets in substantially horizontal position, means on said tail gate engageable with said frame to support said tail gate in substantially vertical position across the bottom of said rear door opening, means for supplying hydraulic fluid under pressure to and exhausting fluid from said hydraulic cylinders, and a manually-operated reversing valve hydraulically interposed between said means and said cylinders, said frame having at each side of its rear end a rearward extension provided with a notch in its upper edge and said means on said tail gate engageable with said frame comprising lugs extending from respectively opposite ends of said tail gate and receivable in the notches of said frame extensions when said tail gate is in substantially vertical position across the bottom of said rear door opening.

3. A loading and unloading lift for a burden vehicle having a frame and a body supported on said frame and having a rear door opening in said body, said lift comprising a pair of substantially vertically-disposed hydraulic cylinders mounted in the body one at each side of said rear door opening, a piston in each cylinder, a piston rod slidable through the bottom end of each cylinder and connected at its upper end to the corresponding piston, a bracket on the bottom end of each piston rod, a tail gate pivotally connected at its opposite ends to said brackets and supported by said brackets in substantially horizontal position, means on said tail gate engageable with said frame to support said tail gate in substantially vertical position across the bottom of said rear door opening, means for supplying hydraulic fluid under pressure to and exhausting fluid from said hydraulic cylinders, and a manually-operated reversing valve hydraulically interposed between said means and said cylinders, said reversing valve being mounted on a wall of said body and having one operating means inside and another operating means outside of said body.

WALTER E. SNOW.

REFERENCES CITED

The following references are of record in the file of this patent:

UNITED STATES PATENTS

| Number | Name | Date |
| --- | --- | --- |
| 1,919,608 | Troell | July 25, 1933 |
| 2,110,239 | Richter | Mar. 8, 1938 |
| 2,200,436 | Van Blarcom et al. | May 14, 1940 |
| 2,234,513 | Zimicki | Mar. 11, 1941 |
| 2,405,054 | Pringle | July 30, 1946 |